United States Patent
Craig et al.

(10) Patent No.: US 10,532,640 B2
(45) Date of Patent: Jan. 14, 2020

(54) REMOVABLE ROOF STRUCTURE

(71) Applicant: Ford Global Technologies, LLC, Dearborn, MI (US)

(72) Inventors: Ryan Craig, Canton, MI (US); Cathy Bingfeng Xi, Novi, MI (US); Prakash Basavarajaiah, Canton, MI (US); Shyam Pittala, Canton, MI (US); Hassen Hammoud, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/992,863

(22) Filed: May 30, 2018

(65) Prior Publication Data

US 2019/0366820 A1    Dec. 5, 2019

(51) Int. Cl.
*B60J 7/08* (2006.01)
*B60J 7/10* (2006.01)
*B60J 7/19* (2006.01)

(52) U.S. Cl.
CPC .............. *B60J 7/106* (2013.01); *B60J 7/194* (2013.01)

(58) Field of Classification Search
CPC ....... B60J 7/08; B60J 7/16; B60J 7/106; B60J 7/194; B60J 7/1628; B60J 7/1635; B62D 25/04; B62D 25/2036
USPC .......................... 296/203.01, 203.03, 193.06
See application file for complete search history.

(56) References Cited

U.S. PATENT DOCUMENTS

| | | | |
|---|---|---|---|
| 5,092,649 A * | 3/1992 | Wurl | B62D 27/065 29/401.1 |
| 6,493,920 B1 | 12/2002 | Hill et al. | |
| 6,786,529 B2 | 9/2004 | Hasselgruber et al. | |
| 7,243,983 B2 * | 7/2007 | Rashidy | B60J 7/126 296/107.09 |
| 7,293,823 B2 * | 11/2007 | Chen | B62D 25/06 296/193.06 |
| 8,419,117 B2 | 4/2013 | Stephens | |
| 2003/0159264 A1 | 8/2003 | McLeod et al. | |
| 2005/0194811 A1 * | 9/2005 | Fischer | B60J 7/126 296/108 |

(Continued)

FOREIGN PATENT DOCUMENTS

DE    10132675 A1    1/2003
EP    0354325 A2    2/1990

(Continued)

OTHER PUBLICATIONS

Pollard, T., "It's the New 2016 Smart Fortwo Cabriolet: The Smallest Soft-Top Going!", Aug. 27, 2015, http://www.carmagazine.co.uk/car-news/motor-shows-events/frankfurt/2015/its-the-new-2015-smart-fortwo-cabriolet-the-smallest-soft-top-going/>.

*Primary Examiner* — Dennis H Pedder
(74) *Attorney, Agent, or Firm* — Vichit Chea; Brooks Kushman, P.C.

(57) ABSTRACT

A vehicle is provided. The vehicle may include a detachable roof assembly that includes an upper B-pillar extending from a longitudinal roof rail that extends between a pair of transverse roof bows. The vehicle may also include a frame assembly. The frame assembly may include a lower B-pillar that extends from a rocker panel to a beltline of the vehicle. The lower B-pillar may include an upper end that defines a receptacle that may receive at least 50% of the upper B-pillar when the roof assembly is assembled to the frame assembly.

12 Claims, 3 Drawing Sheets

(56) References Cited

U.S. PATENT DOCUMENTS

2012/0160592 A1* 6/2012 Tsumiyama ......... B62D 21/183
180/312

FOREIGN PATENT DOCUMENTS

| JP | 4743567 B2 | 8/2011 |
| WO | 2006099648 A2 | 9/2006 |

* cited by examiner

REMOVABLE ROOF STRUCTURE

TECHNICAL FIELD

The present disclosure relates to a removable roof structure for a vehicle.

BACKGROUND

Those that enjoy the sound of the open road and wind blowing in their hair, a vehicle that can be converted from an enclosed cabin to an open-air cabin may be enticing. Detachable tops or structural roof assemblies may be disengaged and removed from the vehicle body to create the open-air cabin. In conventional vehicles, the roof is not detachable and acts as a portion of the structural frame to stiffen the overall vehicle body structure. Providing a detachable roof structure that provides similar structural stiffness is one of the challenges in this field.

SUMMARY

According to one embodiment of this disclosure, a vehicle is provided. The vehicle may include a detachable roof assembly that comprises an upper B-pillar extending from a longitudinal roof rail that extends between a pair of transverse roof bows. The vehicle may also include a frame assembly. The frame assembly may include a lower B-pillar that extends from a rocker panel to a beltline of the vehicle. The lower B-pillar may include an upper end that defines a receptacle that may receive at least 50% of the upper B-pillar when the roof assembly is assembled to the frame assembly.

According to another embodiment of this disclosure, a five-door vehicle is provided. The five-door vehicle may include a frame assembly comprising a lower B-pillar extending from a rocker and terminating at a beltline of the vehicle and forming a receptacle. The vehicle may also include a roof assembly including an upper B-pillar including hydroformed tube extending from a longitudinally extending roof rail. At least one-third of a length of the upper B-pillar may be disposed within the receptacle. The upper B-pillar and the lower B-pillar may be detachably connected to one another by a connector.

According to yet another embodiment of this disclosure, a five-door vehicle is provided. The vehicle may include a frame assembly comprising a lower B-pillar forming a receptacle, and bifurcating front and rear side ingress/egress openings. The vehicle may also include a roof assembly including an upper B-pillar including a tube extending from a longitudinally extending roof rail. At least one-third of a length of the upper B-pillar may be disposed within the receptacle. The upper B-pillar and the lower B-pillar may be detachably connected to one another by a connector.

BRIEF DESCRIPTION OF THE DRAWINGS

FIG. 3A is a cross-sectional view take along the lines 3A in FIG. 3.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
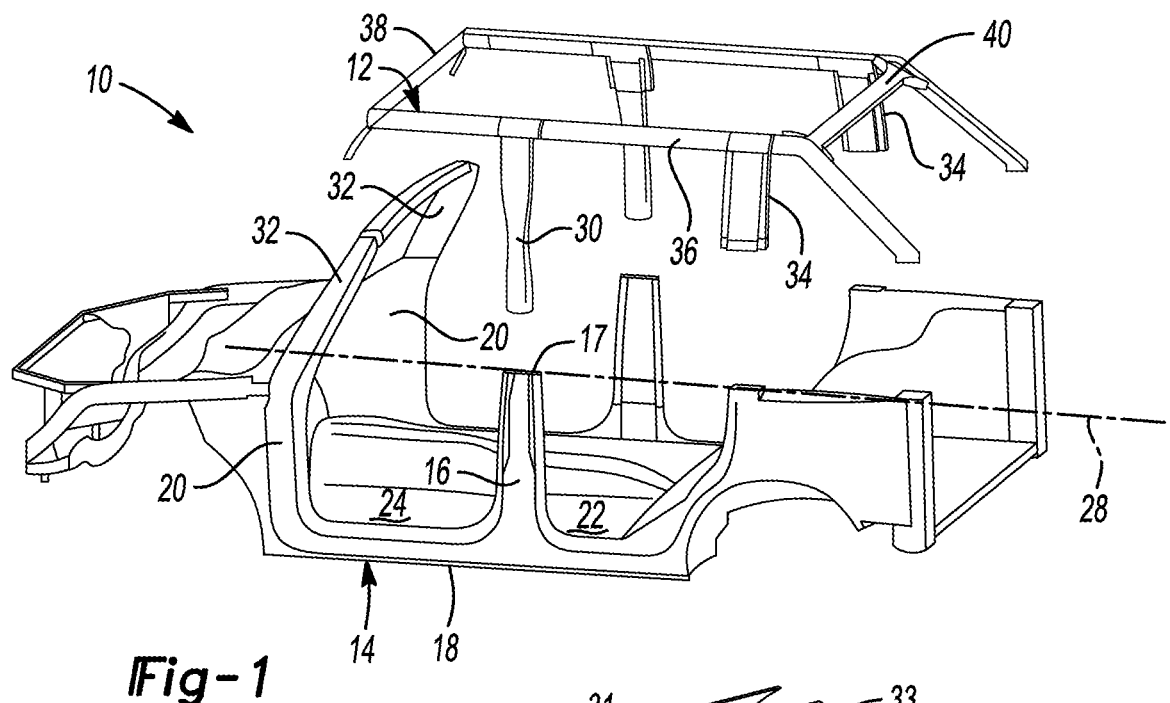
FIG. 1 is an exploded-perspective view of an example vehicle that includes the removable roof structure according to at least one embodiment of this disclosure.

With reference to FIG. 1, a vehicle or more specifically a five-door sport utility vehicle 10 is shown. The vehicle 10 may include a removable or detachable roof assembly 12, which may be configured to attach and detach to a vehicle frame 14. The vehicle frame 14 may be comprised of various structural members, such as a lower B-pillar 16, that forms a receptacle 17 and extends from a rocker panel 18 to a beltline 28 of the vehicle frame 14. The beltline 28 of the vehicle may refer to demarcation between body panels of the vehicle 10 and the side windows of the vehicle 10.

The roof assembly 12 includes a pair of upper B-pillars 30 each extending from a pair of longitudinally extending roof rails 36. Because the upper B-pillars are symmetrically opposite (e.g., mirrored) to one another, only one will be discussed. The upper B-pillar 30 may be comprised of an elongated-tapered tube 29 that is inserted into the receptacle 17 defined by the lower B-pillar 16. The upper B-pillar 30 and the lower B-pillar 16 are each configured so that at least one-third of the upper B-pillar 30 is disposed within the receptacle 17 when the roof assembly 12 is connected to the vehicle.

The pair of longitudinally extending roof rails 36 are connected by a front roof bow 38 and a rear roof bow 40. The front roof bow 38 may attach to a pair of A-pillars 32 that extend from a hinge pillar 20 of the vehicle frame 14 when the roof assembly is attached to the frame 14. Similarly, the rear roof bow 40 may attach to a pair of C-pillars 34 that extend from a portion of near the rear quarter panel 22. A driver-side front opening 24 is defined by the hinge pillar 20, the rocker panel 18, and the lower B-pillar 16. A driver-side rear opening is defined by the rear quarter panel 22, the rocker panel 18, and the lower B-pillar.

Figure 2:
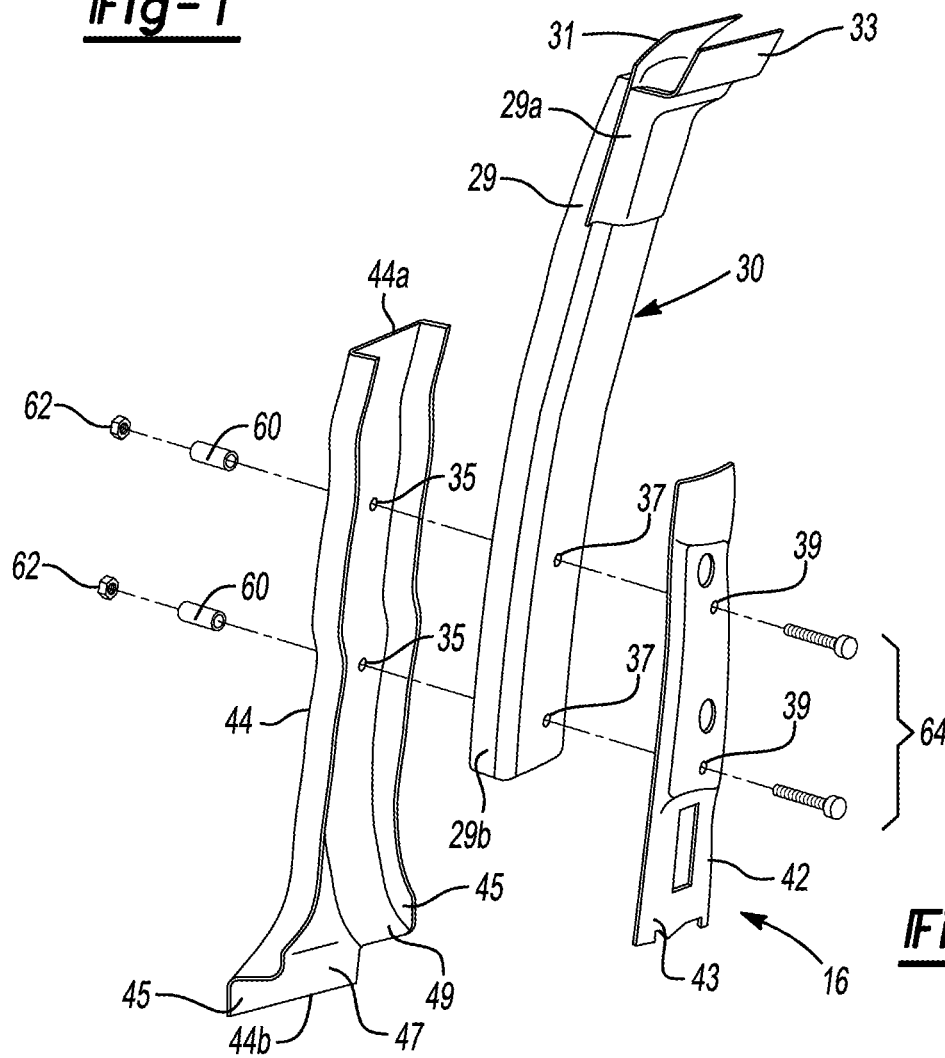
FIG. 2 is an exploded-perspective of a B-pillar assembly of the removable roof structure.
Figure 3:
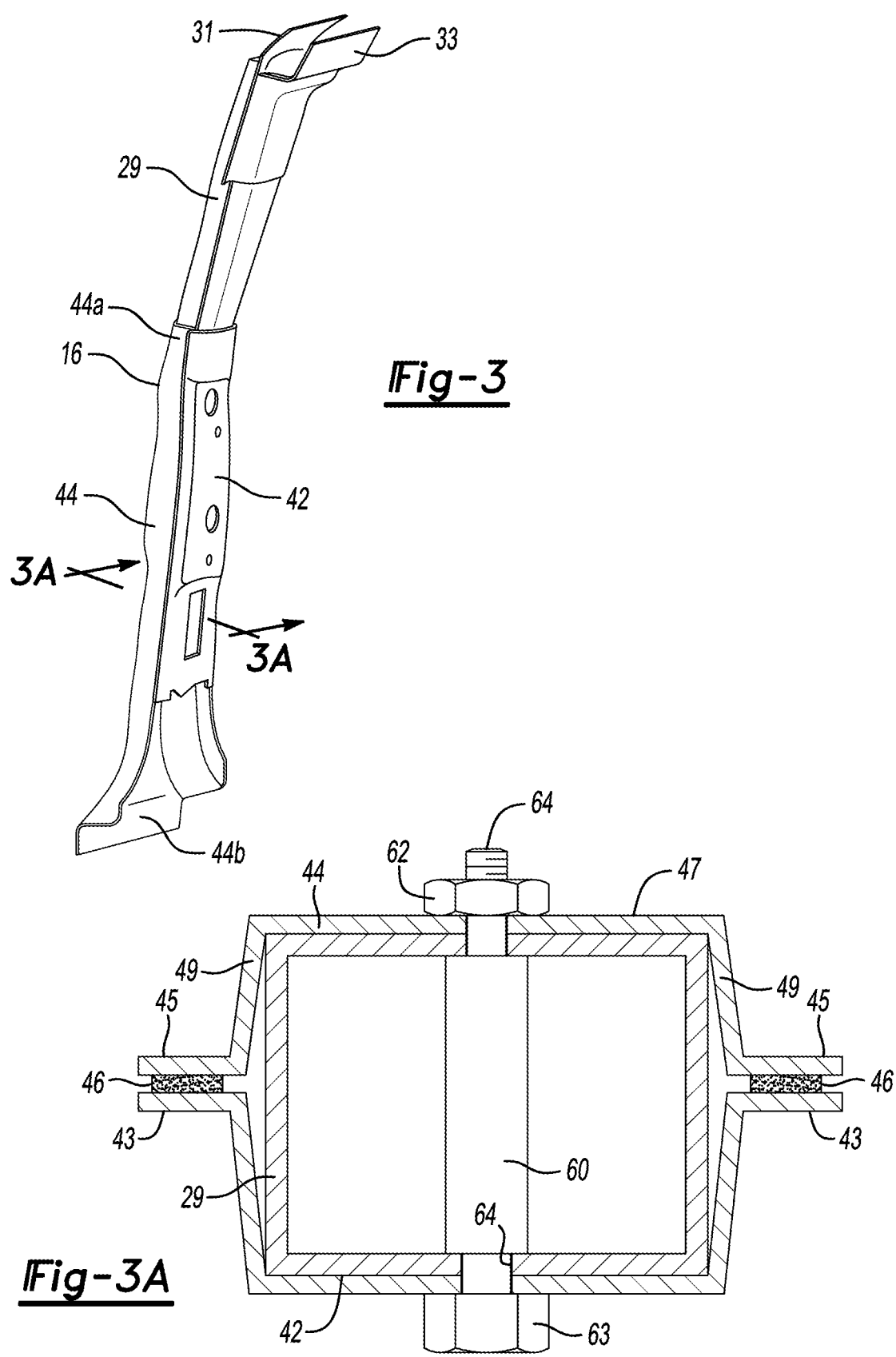
FIG. 3 is a perspective view of the B-pillar assembly of the removable roof structure.

Referring to FIGS. 2 through 3A, the upper B-pillar 30 and the lower B-pillar 16 are provided. The lower B-pillar 16 may include an outer panel 44 that is attached to an inner panel 42. The inner and outer panels may each be comprised of U-shaped metal stampings that are attached to one another by one or more welds 46. The outer panel 44 may include a medial section 47 that is spaced apart from a pair of peripheral flanges 45 by a pair of structural ribs 49. The medial section defines a first set of apertures 35 that are aligned with a second set of apertures 37 defined by the upper B-pillar 30 and a third set of apertures 39 defined by the inner panel 42. Furthermore, the outer panel 44 includes an upper end 44a that terminates at the beltline 28 of the vehicle frame 14 and a bottom end 44b that is attached to the rocker panel 18.

One or more fasteners or connectors, such as bolts 64, may be inserted through the first set of apertures 35 so that they extend through the second and third sets of apertures, and vice-versa. A set of reinforcement sleeves 60 may be disposed within the upper B-pillar 30 so that they are aligned with the second set of apertures 37. The reinforcement sleeves 60 may provide additional cross-section to the fastening joint to absorb shear forces through the upper B-pillar 30 and the lower B-pillar 16. A set of female fasteners, such as nuts 62 may be disposed within the outer panel 44 and aligned with the first set of apertures. The bolts 64 may thread into the nuts 62 so that the upper B-pillar 30 is detachably connected to the lower B-pillar 16. Each of the bolts 64 may include a head configured to engage a tool (e.g., socket, wrench, etc.) so that the bolt may be threaded into and out of the nut 62. In one or more embodiments, the nut 62 may be a weld nut attached to the outer panel 44.

The upper B-pillar 30 may include a tube 29 that has an upper end 29a and a lower end 29b. The upper end 29a may be attached to a first flange bracket 31 and a second flange bracket 33. The first and second flange brackets 31 and 33 may define a trough or channel that is configured to receive the longitudinal roof rail 36. The flange brackets 31 and 33 may be stamped metal brackets that are attached to the upper end 29a by one or more welds or other suitable attachment configurations. The tube 29 may be a hydroformed tube comprised of aluminum or other suitable metal or alloy. Aluminum hydroformed tubes are generally formed by extruding an aluminum billet through an extrusion die at a high temperature and at high pressure to form a straight cylindrical (e.g., round, square, rectangle) section. The cylindrical section is then fed into a hydroforming press that bends the section to a desired shape.

Figure 4:
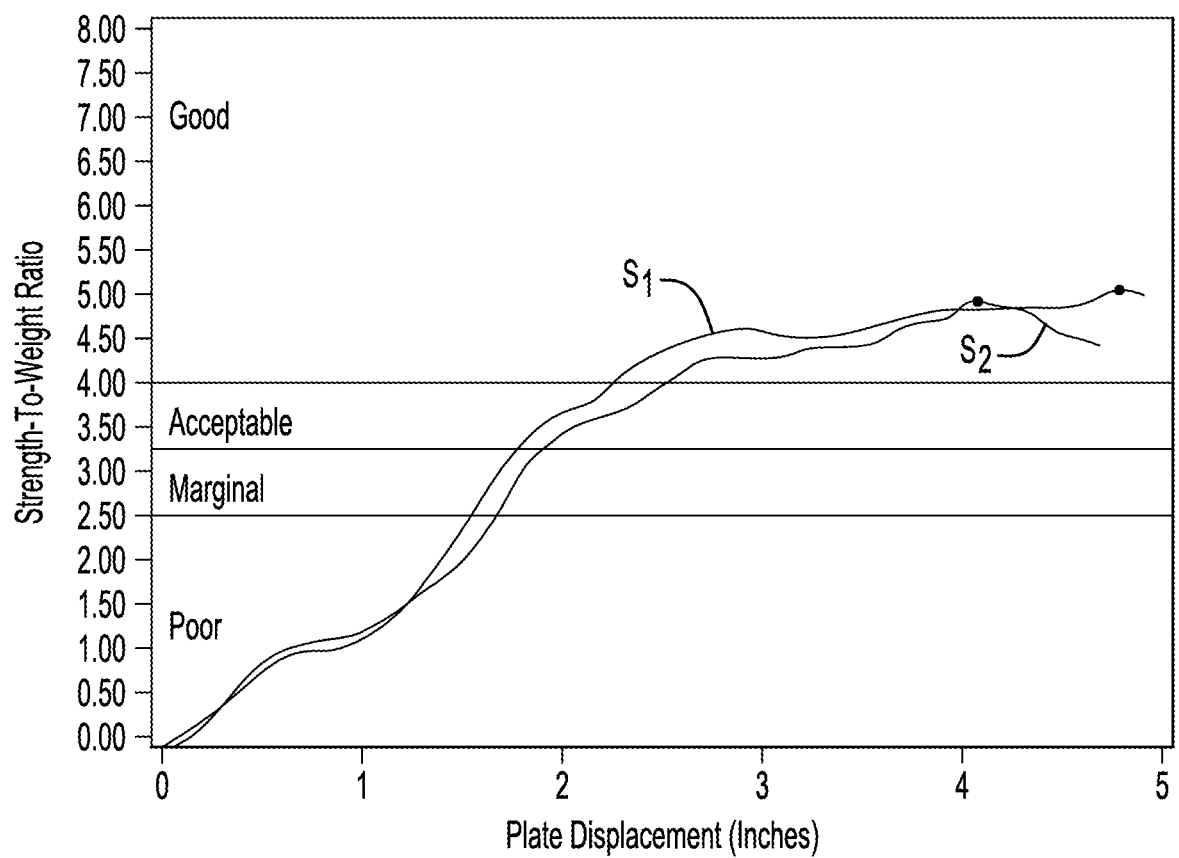
FIG. 4 is a graph comparing displacement of the removable roof structure versus a conventional roof structure under a simulated test.

Referring to FIG. 4, a graph comparing displacement of a conventional fixed roof against the detachable roof assembly 12 undergoing a simulated roof strength test. In the test, the strength of the roof is determined by pushing a metal plate against one side of it at a slow but constant speed. The force applied relative to the vehicle's weight is known as the strength-to-weight ratio. This ratio varies as the test progresses. The peak strength-to-weight ratio recorded at any time before the roof is crushed 5 inches is the key measurement of roof strength. A good rating requires a strength-to-weight ratio of at least 4. In other words, the roof must withstand a force of at least 4 times the vehicle's weight before the plate crushes the roof by 5 inches. For an acceptable rating, the minimum required strength-to-weight ratio is 3.25. For a marginal rating, it is 2.5. Anything lower than that is poor. The x-axis of the graph represents displacement (mm) of the plate during the simulation. The y-axis represents the strength-to-weight ratio as described above. Line S1 represents a conventional roof structure, one that is not detachable. Line S2 represents the roof assembly as illustrated in the Figures.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a detachable roof assembly including,
        a pair of transverse roof bows;
        a longitudinal roof rail extending between the pair of transverse roof bows, and
        an upper B-pillar defined by an elongated tapered tube extending from the longitudinal roof rail; and
    a frame assembly including,
        a rocker panel,
        a lower B-pillar defined by a pair of U-shaped panels welded together end to end such that the lower B-pillar defines a receptacle extending from the rocker panel to a beltline of the vehicle and configured to receive the elongated tapered tube, wherein an inner surface of the receptacle contacts an outer surface of the elongated tapered tube such that apertures defined by the elongated tapered tube and the receptacle are aligned; and
    a bolt extending through the apertures.

2. The vehicle of claim 1 wherein the upper B-pillar includes a pair of opposing flanges that extend from an upper end of the tube to define a trough configured to receive the roof rail.

3. The vehicle of claim 1 wherein the elongated tapered tube is hydroformed aluminum tube.

4. The vehicle of claim 1 further comprising:
    a reinforcement sleeve extending between sidewalls of the elongated tapered tube and defining an inner diameter configured to receive the bolt.

5. A five-door vehicle comprising:
    a frame assembly including,
        a rocker,
        a lower B-pillar forming a receptacle extending from the rocker and terminating at a beltline of the vehicle and forming a receptacle;
    a detachable roof assembly including
        longitudinally extending roof rail,
        an upper B-pillar defined by a hydroformed elongated tapered tube extending from the longitudinally extending roof rail wherein an inner surface of the receptacle contacts an outer surface of the hydroformed elongated tapered tube such that at least one-third of a length of the hydroformed elongated tapered tube is disposed within the receptacle and an aperture defined by the hydroformed elongated tapered tube and the receptacle are aligned; and
    a connector extending through the apertures and detachably connecting the lower B-pillar and the upper B-pillar.

6. The five-door vehicle of claim 5 wherein the lower B-pillar includes inner and outer U-shaped panels each fixed to another to define a tapered cylindrical structure narrowing from a base of the outer U-shaped panel to the beltline.

7. The five-door vehicle of claim 6 wherein portions of the inner U-shaped panel are fixed to and in direct contact with a portion of a pair of side flanges of the outer U-shaped panel.

8. The five-door vehicle of claim 5 wherein the connector includes
    at least one bolt that extends through the aperture defined by the receptacle and the aperture defined by hydroformed elongated-tapered tube; and
    at least one reinforcement sleeve extending between inner surfaces of the hydroformed elongated-tapered tube and defining an inner diameter configured to receive the at least one bolt.

9. A five-door vehicle comprising:
    a frame assembly forming front and rear side ingress/egress openings and including a lower B-pillar defined by a pair of U-shaped panels welded together end to end such that the lower B-pillar forms a receptacle, wherein the lower B-pillar bifurcates the front and rear side ingress/egress openings;
a roof assembly including
   a longitudinally extending roof rail,
   an upper B-pillar defined by an elongated tapered tube extending from the longitudinally extending roof rail, wherein an inner surface of the receptacle contacts an outer surface of the elongated tapered tube such that apertures defined by the elongated tapered tube and the receptacle are aligned and at least one-third of a length of the upper B-pillar is disposed within the receptacle; and
a connector detachably connecting the lower B-pillar and the upper B-pillar.

10. The five-door vehicle of claim 9 wherein the upper B-pillar includes a pair of opposing flanges that extend from an upper end of the tube to define a trough adapted to receive the roof rail.

11. The five-door vehicle of claim 9 wherein the connector includes a bolt that extends through the aperture defined by the lower B-pillar and the aperture defined by the upper B-pillar.

12. The five-door vehicle of claim 11 wherein the connector further includes a weld nut fixed to an outer surface of the lower B-pillar.

* * * * *